United States Patent [19]

Heilman et al.

[11] 4,132,663
[45] * Jan. 2, 1979

[54] MINERAL OIL COMPOSITIONS HAVING IMPROVED POUR POINT CONTAINING ALPHA-OLEFIN COPOLYMERS

[75] Inventors: William J. Heilman, Allison Park; Thomas J. Lynch, Oakmont, both of Pa.

[73] Assignee: Gulf Research & Development Company, Pittsburgh, Pa.

[*] Notice: The portion of the term of this patent subsequent to Apr. 19, 1994, has been disclaimed.

[21] Appl. No.: 786,537

[22] Filed: Apr. 11, 1977

Related U.S. Application Data

[63] Continuation of Ser. No. 558,946, Mar. 17, 1975, abandoned, which is a continuation-in-part of Ser. No. 308,312, Nov. 21, 1972, abandoned.

[51] Int. Cl.$^2$ ............................................. C10M 1/16
[52] U.S. Cl. .................................... 252/59; 44/62; 44/80
[58] Field of Search ............................ 252/59; 44/62

[56] References Cited

U.S. PATENT DOCUMENTS

| 3,507,636 | 4/1970 | Sweeney | 44/62 |
| 3,509,056 | 4/1970 | Shepherd | 252/59 |
| 3,598,552 | 8/1971 | Cohen et al. | 44/62 |
| 3,631,159 | 12/1971 | Cobbs et al. | 252/59 X |
| 3,795,616 | 3/1974 | Weilman et al. | 252/59 |
| 4,018,695 | 4/1977 | Heilman et al. | 252/59 X |

FOREIGN PATENT DOCUMENTS

| 676516 | 7/1952 | United Kingdom | 252/59 |
| 846685 | 8/1960 | United Kingdom | 252/59 |

Primary Examiner—Delbert E. Gantz
Assistant Examiner—Andrew H. Metz

[57] ABSTRACT

Compounded mineral oil compositions having improved pour point are obtained by the incorporation therein of a minor amount of an alpha-olefin copolymer of 1-hexene and 1-octadecene.

7 Claims, No Drawings

MINERAL OIL COMPOSITIONS HAVING IMPROVED POUR POINT CONTAINING ALPHA-OLEFIN COPOLYMERS

This is a continuation of application Ser. No. 558,946 filed Mar. 17, 1975 which was a continuation-in-part of U.S. Patent application Ser. No. 308,312, filed Nov. 21, 1972 and both now abandoned.

The present invention relates to novel oil compositions of improved pour point comprising a minor amount of an alpha-olefin copolymer of 1-hexene and 1-octadecene. More particularly, the invention relates to a novel mineral oil composition containing a minor amount of an alpha-olefin copolymer of about 60 to about 95 mol percent 1-hexene and about 5 to about 40 mol percent 1-octadecene, the oil composition having a significantly lower pour point than the mineral oil without the copolymer additive.

The pour point of an oil is a characteristic which determines the oil's usefulness and serviceability in the colder climates. An oil's pour point is an approximate indication of the lowest temperature at which the oil can be poured or removed from containers or can be caused to flow through tubing and piping. Service oils including lubricating oils, automatic transmission fluids and the like, must be capable of flowing through automotive systems, their associated transmission lines, or the like at the lowest temperature at which they are used. In a similar manner, fuel oils must be capable of flowing through conveying and transmission lines at the lowest temperature conditions to which they are subjected.

Although the pour point of a mineral oil is only a general indicator of its low temperature flow properties, it provides a useful function and is commonly found in an oil's specifications. Most service oils, and particularly the paraffinic base oils, require a pour point depressant as an additive in order to meet established specifications. Because of the relatively high cost of conventional pour point depressants they are generally not considered for fuel oils, rather other less expensive solutions to low temperature flow problem are utilized.

By our invention we have discovered mineral oil formulations which are compounded with a highly efficacious pour point depressant in minor amounts and at a relatively small cost in contrast with the relatively expensive conventional pour point depressants, such as the polyacrylates and the polymethacrylates. The pour point depressancy is effected particularly in connection with lubricating oils, automatic transmission fluids, fuel oils particularly No. 2 fuel oil, and the like.

These oils of reduced pour point according to our invention are compounded with a minor amount of a copolymer synthesized from a mixture of 1-hexene and 1-octadecene. The 1-hexene comprises broadly from about 60 to about 95 mol percent of the copolymer and the 1-octadecene broadly comprises from about five to about 40 mol percent of the copolymer. Preferably the 1-hexene comprises from about 75 to about 90 mol percent of the copolymer and the 1-octadecene preferably comprises from about 10 to about 25 mol percent of the copolymer. It is generally preferred to use a copolymer in the higher range of 1-hexene content specified above because 1-hexene is the less expensive monomer and because copolymerization to the desired product with a minimum of impurities is more readily effected at the higher 1-hexene to 1-octadecene ratios.

The copolymers can be described as a mixture of long chain molecules formed with a series of repeating units randomly distributed in each chain, each repeating unit having the structural formula:

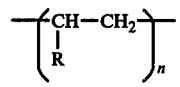

in which R is the group $-(CH_2)_{m-3}CH_3$ wherein m is the carbon number of the monomer from which the repeating unit is derived, that is, m is either 6 or 18, and n is the number of repeating units in an individual molecule. The average number of repeating units, n in the copolymer is at least about 50 and the maximum average number of repeating units is about 5,000. The 1-hexene and 1-octadecene are preferably copolymerized by a procedure in which they are caused to randomly join together in the polymer chain in essentially the same molar ratio that each alpha-olefin occurs in the initial reaction mixture in order to simplify the preparation of the desired product composition. Thus, when a starting mixture comprising nine mol percent 1-octadecene and 91 mol percent 1-hexene is used, any specific m in the above structural formula will have a nine percent chance of being 18 and a 91 percent chance of being six. And in any specific molecule of such copolymer essentially nine percent of the dependent groups will be derived from 1-octadecene and 91 percent of the dependent groups will be derived from 1-hexene. The polymer chains terminate with hydrogen or with a double bond.

Surprisingly, we have discovered that the copolymers of 1-hexene and 1-octadecene as described herein are uniquely excellent as pour point depressants for general use in various oils including lubricating oils, automatic transmission oils and No. 2 fuel oils. In contrast other copolymer combinations of closely related alpha-olefins possess little or no pour point effectiveness for these oils in the small quantities specified herein.

Furthermore, other alpha-olefin copolymer formulations, particularly those involving alpha-olefins smaller than 1-hexene, are partially crystalline at the low temperatures at which pour point in an oil presents a problem. This crystallization characteristic interferes with their consideration for use in pour point depressancy. As a mineral oil cools, a small fraction of the oil, usually paraffinic structures, crystallizes out in an interlocking crystal structure which thickens the oil and prevents it from flowing. At this reduced temperature the pour point depressant must itself be in solution to interfere with the flow preventing growth of this interlocking crystal structure formed by these crystallizing mineral oil components. If the pour point depressant should crystallize at this low temperature, the crystallizing portion of this pour point depressant would be removed as a functional element and would undesirably add to the crystallizing fraction of the mineral oil. Thus, the efficacy of a polymer as a pour point depressant at a low temperature is, in part, dependent upon its solubility, that is, non-crystallinity, at that low temperature. We have determined that the desirable copolymer formulations hereunder are fortuitously non-crystalline and completely soluble and fully functional as effective pour point depressants in the mineral oils not only at the common operative temperature of $-25°$ F. but also at $-40°$ F. and lower.

The crystallinity of a polymeric pour point depressant at any specific temperature can be determined as the degree of insolubility in n-heptane at that temperature. The degree of crystallinity, i.e., n-heptane insolubility, will increase as the temperature decreases. The copolymers of 1-hexene and 1-octadecene as described herein are completely soluble in n-heptane at the low temperatures at which pour point depressancy is effected.

We have determined that the weight percent of a specific copolymer of 1-hexene and 1-octadecene to be used in an oil to obtain the desired pour point reduction can be determined by reference to the average molecular weight $M_o$ of the monomers in the proportion that they are incorporated into the copolymer. Thus, we have determined that the amount of the copolymer to be used in an oil to obtain pour point reduction is broadly at least about 0.025 and preferably at least about 0.05 weight percent multiplied by the ratio $M_o/84$ and the maximum amount is preferably about 0.2 and broadly about 0.4 weight percent multiplied by the same ratio. For example, the copolymer prepared from nine mol percent 1-octadecene and 91 mol percent 1-hexene, in which $M_o$ is 99, is broadly used in the range of from about 0.03 to about 0.47 weight percent. In like manner the broad and the preferred ranges of other proportions of 1-hexene and 1-octadecene in the copolymer are obtained from the molecular weight ratio $M_o/84$ of the starting monomer mixture as described. The denominator, 84, of this ratio is the molecular weight of 1-hexene.

A fully compounded lubricating oil or automatic transmission fluid as prepared for automotive use contains other additives that must be used to meet various specifications or to overcome various deficiencies. One advantage of the copolymer additive described herein for improvement of the pour point is that it is fully compatible with and does not interfere with or detract from the functioning of other additives. Other additives which can be added to the oils are preferably those which have demonstrated their effect by actual use and include antioxidants, blooming agents, detergents, dispersants, rust inhibitors, anti-wear agents, antifoam agents, extreme pressure agents, corrosion inhibitors, sludge inhibitors, metal deactivators, antiscuffing agents and the like. These additives are selected and used to meet desired specifications or overcome deficiencies in the base oil with respect to the intended use in accordance with procedures which are conventional and well known to those in the field of compounding automotive oils.

In the case of fuel oil the copolymer pour point depressant, when used, is likely the only additive present. This additive would only be used in the fuel oil to permit flow through transmission or pipelines or to retard solidification in storage tanks in cold climates. Even though a pour point depressant if it is used in fuel oil would be used in minute percentage amounts, it could be used in relatively large total amounts because of the large overall volume of fuel oil involved. Therefore, a fuel oil additive must be inexpensive to be accepted for this use.

The copolymers used in forming the oil compositions of this invention are preferably made by catalyzing the 1-hexene and 1-octadecene mixture using a Ziegler-Natta type catalyst. Either continuous, semi-continuous in which only the alpha-olefins are added during reaction, or batch polymerization can be used, provided that all conditions and proportions of chemical species present in the reaction mixture are properly correlated with each other to obtain the desired copolymer product. Any Ziegler-Natta type catalyst can be used which is useful for the polymerization of propylene. Particularly useful are titanium and vanadium salts, primarily the chlorides, in conjunction with aluminum alkyls and alkyl chlorides. We have found that purple titanium trichloride together with aluminum triethyl constitutes an excellent catalyst. A catalyst containing from about one to about 10 gram atoms of aluminum per gram atom of titanium is useful with a ratio of about 1.8 to about three being preferred. The reaction is suitably carried out using about 300 to about 6,000 grams of olefin per gram of catalyst and preferably from about 1,500 to about 3,000 grams of olefin per gram of catalyst.

Hydrogen or another suitable molecular chain length modifier such as zinc chloride, dialkyl zinc such as diethyl zinc and the like helps to direct the reaction to the desired product. The partial pressure of hydrogen can broadly be between about 0.1 and about 150 p.s.i. and preferably between about 0.5 and about 25 for a continuous polymerization and between about 0.5 and about 10 for a semi-continuous or batch reaction. The temperature at which the polymerization reaction is conducted can suitably be between about 100° F. and about 250° F. and preferably between about 220° F. and about 250° F.

A suitable solvent for the reaction mixture is desirable since the resulting copolymer is highly viscous and can be substantially non-flowable at room temperature. Suitable solvents include hydrocarbon solvents such as butane, pentane, hexane, heptane, and the like, naphtha, gasoline fractions, kerosene, mineral oils such as gas oil fractions, furnace oil fractions, light lubricating oils, heavy lubricating oils and the like. Organic hydrocarbon solvents such as benzene, toluene, the xylenes and the like and chlorinated hydrocarbon solvents are less preferred. The most preferred solvents are those light solvents which can be easily distilled from the product copolymer or mineral oils which can be incorporated in the finished oil together with the copolymer. We find that a mineral oil which is pretreated with hydrogen in the presence of a Ziegler-Natta type catalyst is particularly useful herein. Since a solvent is not necessary, it can be used in amounts from zero percent to about 75 percent of total charge to the reactor and when used, it is preferably used in an amount of about 25 to about 60 percent.

Variables which affect the nature of the copolymer product include the reaction temperature, the partial pressure of hydrogen or the amount of other chain length modifier, the amount of catalyst, the titanium/aluminum ratio in the catalyst, the titanium compound used, the olefin to catalyst ratio, the olefin concentration, and the like. Furthermore, it is essential that certain deleterious impurities, particularly those containing oxygen such as air, water and the like be substantially excluded from the reactor. In contrast with this requirement, it is well known that it is advantageous to add trace amounts of oxygen or oxygen containing compound to the alpha-olefin polymerization reaction in order to substantially increase the yield of product per amount of catalyst used. Therefore, trace amounts of oxygen are generally beneficial in alpha-olefin polymerization. However, too much oxygen results in erratic and non-reproducible polymerization reactions.

The polymer made by the Ziegler-Natta type catalyst contains substantially completely a head-to-tail alignment of the repeating units in the molecules forming the polymer. Any suitable Ziegler-Natta catalyst system can be used provided that all conditions and variables are properly correlated to produce the desired copolymer product. It is possible, by catalyst selection and careful control of synthesis conditions, to obtain random polymerization of the mixture of monomers in the same proportion that the monomers are present in the reaction zone. By this controlled random synthesis, the possibility that any dependent group in the above structural formula is either from 1-hexene or 1-octadecene is essentially the same as the mol percent of that 1-olefin in the reaction mixture.

The following examples are set out to illustrate our invention and to provide a better understanding of its details and advantages. In preparing the copolymers all reactants, solvents and catalysts were of ultra-high purity for the reaction. The pour point determinations were made by the method described in ASTM D97 which results in an accuracy of ±5° F. In all examples the copolymer was completely soluble in the oil at the temperature of the pour point determination and evidenced no crystallinity at this temperature.

The 1-octadecene used herein was approximately 90 weight percent of the specified 1-olefin, about eight weight percent of other olefins of the same carbon number as the specified 1-olefin, primarily a vinylidene isomer, and about one weight percent of the next lower and next higher 1-olefin. The 1-hexene used herein was greater than 96 weight percent of the specified 1-hexene.

EXAMPLES 1-24

A high molecular weight copolymer of 1-hexene and 1-octadecene was made in a 250 ml. Erlenmeyer flask in a shaker oil bath. One gram of $(TiCl_3)_3 \cdot AlCl_3$ (Stauffer Chemical Company grade AAX), two ml. of triethyl aluminum (Al/Ti atomic ratio of 4.0) and 100 ml. of n-heptane were placed in the flask which was then purged with hydrogen for 30 minutes at a bath temperature of 49° C. A mixture of 26.9 g. (88 mol percent) 1-hexene and 11.02 g. (12 mol percent) 1-octadecene was then injected into the flask. After reacting for two hours at a constant bath temperature of 49° C., 20 cc. of a 50/50 weight percent mixture of n-butanol and 2,4-pentadione was added to solubilize and quench the catalyst. After the mixture was treated with 10 percent aqueous sodium hydroxide, the aqueous layer was separated from the organic layer. The copolymer was precipitated from the organic layer by isopropyl alcohol, dried and dissolved as a 33 weight percent concentrate in a dewaxed, hydrofined oil having a 210° F. viscosity of 3.2 cs.

The resulting copolymer comprising 12 percent of its repeating units from 1-octadecene and 88 percent of its repeating units from 1-hexene had a weight average molecular weight, $M_w$, of 170,000 and a distribution factor, $M_w/M_n$ of 9.2 as determined by gel permeation chromatography using an instrument that was calibrated using known standard poly(1-hexene) fractions. The average number of repeating units, n, was determined to be about 1,600 using the average molecular weight of 104.2 for the copolymerization mixture. This copolymer and a series of related copolymers made in an equivalent manner were mixed with a commercially available No. 2 fuel oil having an unaided pour point of 0° F. to determine the pour point depression effected by the copolymer additives. Various homopolymers as well as a copolymer of higher alpha-olefins were also tested in this No. 2 fuel oil for possible pour point depression. The results of these experiments are set forth in Table I in which only the mol percent of the higher olefin is indicated for various amounts (weight percent) of polymer additive.

Table I

| Ex. | Lower Olefin | Higher Olefin | Mol % | Pour Point, °F. 0.05% | 0.1% | 0.2% |
|---|---|---|---|---|---|---|
| 1 | $C_6$ | $C_{16}$ | 7.5 | — | −5 | −5 |
| 2 | $C_6$ | $C_{16}$ | 10.0 | — | −5 | −5 |
| 3 | $C_6$ | $C_{18}$ | 7.0 | −15 | −20 | −25 |
| 4 | $C_6$ | $C_{18}$ | 8.0 | −10 | −25 | — |
| 5 | $C_6$ | $C_{18}$ | 9.0 | −15 | −25 | — |
| 6 | $C_6$ | $C_{18}$ | 10.0 | — | −25 | −40 |
| 7 | $C_6$ | $C_{18}$ | 11.0 | −20 | −30 | — |
| 8 | $C_6$ | $C_{18}$ | 12.0 | −15 | −30 | — |
| 9 | $C_6$ | $C_{18}$ | 15.0 | −15 | −25 | — |
| 10 | $C_6$ | $C_{18}$ | 18.0 | −20 | −30 | — |
| 11 | $C_6$ | $C_{18}$ | 24.0 | −25 | −30 | — |
| 12 | $C_6$ | $C_{18}$ | 33.0 | −25 | −30 | — |
| 13 | $C_6$ | $C_{18}$ | 39.0 | −5 | −25 | — |
| 14 | $C_6$ | $C_{20}$ | 7.0 | −10 | — | — |
| 15 | $C_6$ | $C_{20}$ | 10.0 | −10 | −20 | — |
| 16 | $C_8$ | $C_{16}$ | 7.5 | — | — | −5 |
| 17 | $C_8$ | $C_{18}$ | 10.0 | — | — | −5 |
| 18 | $C_{10}$ | $C_{16}$ | 7.5 | — | — | −5 |
| 19 | $C_{10}$ | $C_{18}$ | 7.5 | — | — | −5 |
| 20 | none | $C_{12}$ | 100 | −5 | −5 | — |
| 21 | none | $C_{14}$ | 100 | — | −10 | — |
| 22 | none | $C_{16}$ | 100 | — | −5 | — |
| 23 | none | $C_{18}$ | 100 | — | 0 | — |
| 24 | none | $C_{20}$ | 100 | in soluble | | |

EXAMPLES 25-47

A further series of copolymers of lower and higher alpha-olefins made as described in the preceding examples were added to a commercially available medium neutral lubricating oil base stock having a 210° F. viscosity of 7.00 centistokes and a pour point of +5 with no additive present. Various homopolymers as well as a copolymer of higher alpha-olefins were also tested for pour point depression. The results of these experiments are set forth in Table II in the same manner as in the previous table.

Table II

| Ex. | Lower Olefin | Higher Olefin | Mol% | Pour Point, °F. 0.1 wt.% | 0.2 wt.% |
|---|---|---|---|---|---|
| 25 | $C_6$ | $C_{16}$ | 7.5 | — | +5 |
| 26 | $C_6$ | $C_{16}$ | 10.0 | — | +5 |
| 27 | $C_6$ | $C_{18}$ | 7.5 | — | −5 |
| 28 | $C_6$ | $C_{18}$ | 10.0 | — | −10 |
| 29 | $C_6$ | $C_{18}$ | 12.0 | −15 | −20 |
| 30 | $C_6$ | $C_{18}$ | 15.0 | −10 | −25 |
| 31 | $C_6$ | $C_{18}$ | 18.0 | −20 | −20 |
| 32 | $C_6$ | $C_{18}$ | 24.0 | −15 | −25 |
| 33 | $C_6$ | $C_{18}$ | 27.0 | −15 | −30 |
| 34 | $C_6$ | $C_{18}$ | 30.0 | −15 | −20 |
| 35 | $C_6$ | $C_{18}$ | 36.0 | −15 | −20 |
| 36 | $C_6$ | $C_{18}$ | 42.0 | −20 | −25 |
| 37 | $C_6$ | $C_{18}$ | 45.0 | −10 | −15 |
| 38 | $C_6$ | $C_{20}$ | 7.5 | — | +5 |
| 39 | $C_6$ | $C_{20}$ | 10.0 | — | +5 |
| 40 | $C_8$ | $C_{16}$ | 7.5 | — | +10 |
| 41 | $C_8$ | $C_{16}$ | 10.0 | — | +5 |
| 42 | $C_8$ | $C_{18}$ | 7.5 | — | +5 |
| 43 | $C_8$ | $C_{18}$ | 10.0 | — | 0 |
| 44 | $C_{10}$ | $C_{16}$ | 7.5 | — | +5 |
| 45 | $C_{10}$ | $C_{16}$ | 10.0 | — | 0 |
| 46 | $C_{10}$ | $C_{18}$ | 7.5 | — | +5 |
| 47 | $C_{10}$ | $C_{18}$ | 10.0 | — | +5 |

EXAMPLE 48

A copolymer synthesized as described in Example 1 from 85 mol percent 1-hexene and 15 mol percent 1- octadecene was tested as a pour point depressant in formulated automotive-type lubricating oils as set out in Table III.

Table III

| Copolymer added, wt.% | Pour Point, ° F. | | |
|---|---|---|---|
| | SAE 10W | SAE 20W-20 | SAE 30 |
| 0 | +5 | +5 | +5 |
| 0.1 | −5 | −10 | +5 |
| 0.25 | −25 | −20 | −15 |
| 0.50 | −35 | −35 | −15 |

Each oil contained 6.4 weight percent of a commercially used detergent-inhibitor additive to meet SAE SE performance specifications.

It is to be understood that the above disclosure is by way of specific example and that numerous modifications and variations are available to those of ordinary skill in the art without departing from the true spirit and scope of the invention.

We claim:

1. An oil composition of lowered pour point comprising a major amount of a mineral lubricating oil or a No. 2 fuel oil and from about 0.025 ($M_o/84$) weight percent to about 0.4 ($M_o/84$) weight percent of a linear alpha-olefin copolymer synthesized from 1-hexene and 1-octadecene and having the formula

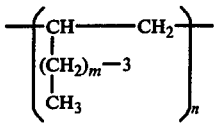

wherein m is 6 or 18 with between about 60 to about 95 percent of the pendant groups resulting from 1-hexene and the remainder resulting from 1-octadecene, and the average of n is between about 50 and about 5,000; and where $M_0$ is the average molecular weight of the 1-hexene and 1-octadecene that is incorporated into said copolymer.

2. An oil composition of lowered pour point in accordance with claim 1 comprising from about 0.05 ($M_o/84$) weight percent to about 0.2 ($M_o/84$) weight percent of said copolymer.

3. An oil composition of lowered pour point in accordance with claim 1 with between about 75 and about 90 percent of the pendant groups of said formula resulting from 1-hexene and the remainder resulting from 1-octadecene.

4. An oil composition of lowered pour point in accordance with claim 1 in which the oil is a mineral lubricating oil.

5. An oil composition of lowered pour point in accordance with claim 1 in which the oil is No. 2 fuel oil.

6. An oil composition of lowered pour point in accordance with claim 1 in which said linear alpha-olefin copolymer is completely soluble at −25° F.

7. An oil composition of lowered pour point in accordance with claim 1 in which said linear alpha-olefin copolymer is completely soluble at −40° F.